(12) United States Patent
Kofford et al.

(10) Patent No.: US 10,353,060 B2
(45) Date of Patent: Jul. 16, 2019

(54) DETECTION AND SIGNAL ISOLATION OF INDIVIDUAL VEHICLE SIGNATURES

(71) Applicant: RAYTHEON BBN TECHNOLOGIES CORP., Cambridge, MA (US)

(72) Inventors: Aaron Scott Kofford, Fairfax, VA (US); Matthew Paul Allen, Arlington, VA (US); Michael Bruce Goldsmith, Framingham, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 0 days.

(21) Appl. No.: 15/791,378

(22) Filed: Oct. 23, 2017

(65) Prior Publication Data

US 2018/0156905 A1     Jun. 7, 2018

Related U.S. Application Data

(60) Provisional application No. 62/431,193, filed on Dec. 7, 2016.

(51) Int. Cl.
*G08G 1/04* (2006.01)
*G01S 11/14* (2006.01)
(Continued)

(52) U.S. Cl.
CPC .............. *G01S 11/14* (2013.01); *G08G 1/015* (2013.01); *G08G 1/0116* (2013.01);
(Continued)

(58) Field of Classification Search
CPC .......... G01S 11/14; G01S 11/00; G01S 7/415; G01S 7/4808
See application file for complete search history.

(56) References Cited

U.S. PATENT DOCUMENTS

| 4,558,439 | A | * | 12/1985 | Gu/ desen | ............. | G01S 3/8036 |
| | | | | | | 367/127 |
| 5,161,127 | A | * | 11/1992 | Grosch | ................... | G01S 3/808 |
| | | | | | | 367/124 |

(Continued)

OTHER PUBLICATIONS

Brown, David J. et al., "Automatic infrasonic signal detection using the Hough transform", Journal of Geophysical Research, 2008, pp. 1-11, vol. 113, D17105.

(Continued)

*Primary Examiner* — Hai Phan
*Assistant Examiner* — Son M Tang
(74) *Attorney, Agent, or Firm* — Lewis Roca Rothgerber Christie LLP

(57) ABSTRACT

A system for isolating signals from individual vehicles. An array of sensors generates a plurality of time records. The time records are transformed into spectrogram structures, and for each time-frequency point in the spectrogram structures, a bearing is calculated, to form a movement structure. A Hough transform is used to fit a movement model to the movement structure, to form a Hough transform structure. Peaks in the Hough transform structure correspond to vehicles and their position in the Hough transform structure correspond to motion parameters, such as the velocity of the vehicle, and the time of closest approach of the vehicle to the array of acoustic sensors. A model of the motion of a vehicle is then used to associate, with the vehicle, points (e.g., structure elements in the spectrogram structures) from the data.

20 Claims, 9 Drawing Sheets

(51) Int. Cl.
*G08G 1/052* (2006.01)
*G08G 1/015* (2006.01)
*G08G 1/01* (2006.01)
*H04R 1/40* (2006.01)
*H04R 3/00* (2006.01)

(52) U.S. Cl.
CPC .............. *G08G 1/0129* (2013.01); *G08G 1/04* (2013.01); *G08G 1/052* (2013.01); *H04R 1/406* (2013.01); *H04R 3/005* (2013.01)

(56) References Cited

U.S. PATENT DOCUMENTS

| | | | | |
|---|---|---|---|---|
| 5,619,616 A * | 4/1997 | Brady | ................ | G01H 3/08 706/20 |
| 5,798,983 A * | 8/1998 | Kuhn | ................ | H04B 11/00 367/127 |
| 5,878,367 A * | 3/1999 | Lee | ................ | G08G 1/04 340/943 |
| 6,133,825 A * | 10/2000 | Matsuoka | ................ | B60Q 9/008 340/436 |
| 6,204,778 B1 * | 3/2001 | Bergan | ................ | G08G 1/075 340/905 |
| 6,342,845 B1 * | 1/2002 | Hilliard | ................ | G08G 1/015 340/933 |
| 6,504,490 B2 * | 1/2003 | Mizushima | ................ | G08G 1/04 340/934 |
| 6,732,064 B1 * | 5/2004 | Kadtke | ................ | G06K 9/00536 702/189 |
| 7,071,841 B2 * | 7/2006 | Haynes | ................ | G01S 11/14 340/943 |
| 7,308,105 B2 * | 12/2007 | Bullen | ................ | G01H 3/125 381/57 |
| 7,454,972 B2 * | 11/2008 | Heyman | ................ | G01G 9/00 73/597 |
| 7,957,225 B2 * | 6/2011 | Steadman | ................ | G01S 5/20 367/124 |
| 8,116,968 B2 * | 2/2012 | Jou | ................ | G08G 1/048 340/907 |
| 8,125,350 B2 * | 2/2012 | Wilbrod | ................ | G08G 1/04 340/933 |
| 8,213,263 B2 * | 7/2012 | Kim | ................ | G01S 3/8083 181/125 |
| 8,331,195 B1 * | 12/2012 | Schumer | ................ | G01P 13/00 340/566 |
| 8,478,500 B1 * | 7/2013 | Vahidi | ................ | B60T 7/18 340/932 |
| 8,838,392 B2 * | 9/2014 | Halliday | ................ | G01V 1/366 367/40 |
| 9,435,873 B2 * | 9/2016 | Regunathan | ................ | G01S 3/8006 |
| 2002/0109624 A1 * | 8/2002 | Schutz | ................ | G01S 13/0209 342/28 |
| 2005/0100172 A1 * | 5/2005 | Schliep | ................ | G08G 1/01 381/71.4 |
| 2008/0089531 A1 * | 4/2008 | Koga | ................ | H04R 3/005 381/92 |
| 2008/0211690 A1 * | 9/2008 | Kinasewitz | ................ | G01S 5/00 340/933 |
| 2013/0151203 A1 * | 6/2013 | McEwen-King | ................ | G01H 9/004 702/189 |
| 2014/0193039 A1 * | 7/2014 | Wexler | ................ | G01C 11/04 382/106 |
| 2015/0098306 A1 * | 4/2015 | Turgut | ................ | G01V 1/38 367/131 |
| 2016/0078760 A1 * | 3/2016 | Crickmore | ................ | G08G 1/04 701/117 |
| 2017/0234966 A1 * | 8/2017 | Naguib | ................ | G01S 5/22 367/117 |
| 2018/0120428 A1 * | 5/2018 | Tuxen | ................ | G01S 7/35 |
| 2018/0132309 A1 * | 5/2018 | Chen | ................ | H04W 84/18 |

OTHER PUBLICATIONS

Hioka, Yusuke et al., "DOA Estimation of Speech Signal Using Microphones Located at Vertices of Equilateral Triangle", IEICE Trans. Fundamentals, Mar. 2004, pp. 559-566, vol. E87-A, No. 3.
"Introduction into Theory of Direction Finding", Rohde & Schwartz, Radiomonitoring & Radiolocation Catalog 2010/2011, pp. 26-49.
Iwano, K. et al., "Noise Robust Speech Recognition Using Prosodic Information", 2005, 4 pages, Springer, Boston, Massachusetts.
Röver, Christian et al., "Identification of Musical Instruments by Means of the Hough-Transformation", 2005, pp. 1-8, Springer, Berlin, Heidelberg.
Website: "Data has two trends; how to extract independent trend-lines?", https://stats.stackexchanqe.com/questions/33078/data-has-two-trends-how-to-extract-independent-trendlines, printed Sep. 6, 2016, 8 pages.

* cited by examiner

DETECTION AND SIGNAL ISOLATION OF INDIVIDUAL VEHICLE SIGNATURES

CROSS-REFERENCE TO RELATED APPLICATION(S)

The present application claims priority to and the benefit of U.S. Provisional Application No. 62/431,193 filed Dec. 7, 2016, entitled "SIGNAL ISOLATION OF INDIVIDUAL VEHICLE SIGNATURES USING A DIRECTION FINDING ARRAY AND THE HOUGH TRANSFORM", the entire content of which is incorporated herein by reference.

GOVERNMENT LICENSE RIGHTS

This invention was made with Government support. The Government has certain rights in the invention.

FIELD

One or more aspects of embodiments according to the present invention relate to acoustic monitoring, and more particularly to a system and method for detecting vehicles using acoustic sensors.

BACKGROUND

In various military and commercial applications it may be useful to monitor vehicles or other objects using acoustic sensors, e.g., using an acoustic array. Distinguishing and separately detecting vehicles from among a plurality of vehicles may be challenging in part because the sound generated by several vehicles may be simultaneously recorded by the array, so that sound generated by one vehicle may interfere with the detection of sound from another vehicle.

Thus, there is a need for an improved system and method for detecting and isolating acoustic signals from moving vehicles.

SUMMARY

Aspects of embodiments of the present disclosure are directed toward a system for isolating signals from individual vehicles. An array of acoustic sensors generates a plurality of time records. The time records are transformed into spectrogram matrices, and for each time-frequency point in the spectrogram matrices, a bearing is calculated, to form a movement matrix. A model of the expected motion of a vehicle, or movement model, is formulated from which movement model parameters are identified such as the velocity of the vehicle, and the time of closest approach of the vehicle to the array of acoustic sensors. The movement model is used to transform the movement matrix from a time vs. bearing parameter space into the movement model parameter space, to form a Hough transform matrix. Peaks in the Hough transform matrix correspond to individual vehicles with unique movement model parameter values (e.g. velocity time of closest approach). The model of the motion of a vehicle with the detected movement model parameters are then used to associate, with the vehicle, points (e.g., elements in the spectrogram matrices) from the acoustic data.

According to an embodiment of the present invention there is provided a system for detecting objects moving along a path, the system including: a plurality of sensors; and a processing circuit connected to the sensors, the processing circuit being configured to: receive a plurality of digital time records of acoustic data, each representing a signal sensed by a respective one of the plurality of sensors, form a plurality of complex spectrogram structures, each of the complex spectrogram structures being formed from a respective one of the digital time records, each element of the complex spectrogram structure having a frequency coordinate and a time coordinate, form a movement structure from the complex spectrogram structures, each element of the movement structure corresponding to a respective element of the complex spectrogram structure and having a value corresponding to an angle of arrival of an acoustic wave at the frequency of the frequency coordinate of the element of the movement structure, fit a movement model to the movement structure, the movement model representing an object moving with constant velocity along the path; and infer a velocity of a first object from the fit.

In one embodiment, the processing circuit is further configured to infer a time of closest approach of the first object from the fit.

In one embodiment, the path is a substantially straight path, and the movement model is a function returning a bearing as a function of two parameters and a time variable t, the parameters being a velocity v of the object and a time of closest approach tCPA, the function being: $\tan^{-1}(v(t-tCPA)/D)$, wherein D is a perpendicular distance from the path to the plurality of sensors.

In one embodiment, the forming of the movement structure includes calculating a bearing, for each element of each of the complex spectrogram structures, using a frequency wavenumber analysis.

In one embodiment, the fitting of a movement model to the movement structure includes: forming a Hough transform structure from the movement structure, for the movement model; and finding coordinates of a first peak in the Hough transform structure, and wherein the inferring of the velocity of the first object from the fit includes inferring the velocity of the first object from the coordinates of the first peak.

In one embodiment, each element of the movement structure has a time coordinate, a frequency coordinate, and a data bearing value, and wherein the forming of the Hough transform includes counting, for a structure element of the Hough transform structure corresponding to a velocity and a time of closest approach, the number of elements of the movement structure for which: the movement model, when evaluated at the time coordinate, the velocity, and the time of closest approach, returns a model bearing value within a first fitting tolerance of the data bearing value.

In one embodiment, the finding of the first peak includes finding a structure element having the greatest value within the Hough transform structure.

In one embodiment, the system includes finding a structure element having the greatest value within a portion of the Hough transform structure excluding a neighborhood of the first peak.

In one embodiment, the system includes finding a maximum value within a portion of the Hough transform structure that is on a straight line joining the first peak and the second peak, and that excludes a neighborhood of the first peak and a neighborhood of the second peak.

In one embodiment, the processing circuit is further configured: from the coordinates of a peak in the Hough transform structure, to generate a movement model corresponding to the coordinates of the peak; and from the movement model, to identify a plurality of structure elements of the movement structure associated with the movement model.

In one embodiment, the identifying of the plurality of structure elements of the movement structure includes identifying elements differing in bearing from the movement model by less than a second fitting threshold.

According to an embodiment of the present invention there is provided a method for detecting objects moving along a path, the method including: receiving a plurality of digital time records of data, each representing a signal sensed by a respective one of a plurality of sensors, forming a plurality of complex spectrogram structures, each of the complex spectrogram structures being formed from a respective one of the digital time records, each element of the complex spectrogram structure having a frequency coordinate and a time coordinate, forming a movement structure from the complex spectrogram structure, each element of the movement structure corresponding to a respective element of the complex spectrogram structure and having a value corresponding to an angle of arrival of a signal at the frequency of the frequency coordinate of the element of the movement structure, fitting a movement model to the movement structure, the movement model representing an object moving with constant velocity along the path; and inferring a velocity of a first object from the fit.

In one embodiment, the method includes inferring a time of closest approach of the first object from the fit.

In one embodiment, the path is a substantially straight path, and the movement model is a function returning a bearing as a function of two parameters and a time variable t, the parameters being a velocity v of the object and a time of closest approach tCPA, the function being: $\tan^{-1}(v(t-tCPA)/D)$, wherein D is a perpendicular distance from the path to the plurality of sensors.

In one embodiment, the forming of the movement structure includes calculating a bearing, for each element of each of the complex spectrogram structures, using a frequency wavenumber analysis.

In one embodiment, the fitting of a movement model to the movement structure includes: forming a Hough transform structure from the movement structure, for the movement model; and finding coordinates of a first peak in the Hough transform structure, and wherein the inferring of the velocity of the first object from the fit includes inferring the velocity of the first object from the coordinates of the first peak.

In one embodiment, each element of the movement structure has a time coordinate, a frequency coordinate, and a data bearing value, and wherein the forming of the Hough transform includes counting, for a structure element of the Hough transform structure corresponding to a velocity and a time of closest approach, the number of elements of the movement structure for which: the movement model, when evaluated at the time coordinate, the velocity, and the time of closest approach, returns a model bearing value within a first fitting tolerance of the data bearing value.

In one embodiment, the finding of the first peak includes finding a structure element having the greatest value within the Hough transform structure.

In one embodiment, the method includes: finding coordinates of a second peak in the Hough transform structure, and inferring, from the coordinates of the second peak: a velocity of a second object, and a time of closest approach of the second object, the finding of the second peak including finding a structure element having the greatest value within a portion of the Hough transform structure excluding a neighborhood of the first peak.

In one embodiment, the method includes: finding coordinates of a third peak in the Hough transform structure, and inferring a velocity of a third object from the coordinates of the third peak, the finding of the third peak including finding a maximum value within a portion of the Hough transform structure that is on a straight line joining the first peak and the second peak, and that excludes a neighborhood of the first peak and a neighborhood of the second peak.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for signal isolation of individual vehicle signatures provided in accordance with the present invention and is not intended to represent the only forms in which the present invention may be constructed or utilized. The description sets forth the features of the present invention in connection with the illustrated embodiments. It is to be understood, however, that the same or equivalent functions may be accomplished by different embodiments that are also intended to be encompassed within the spirit and scope of the invention. As denoted elsewhere herein, like element numbers are intended to indicate like elements or features.

Figure 1:
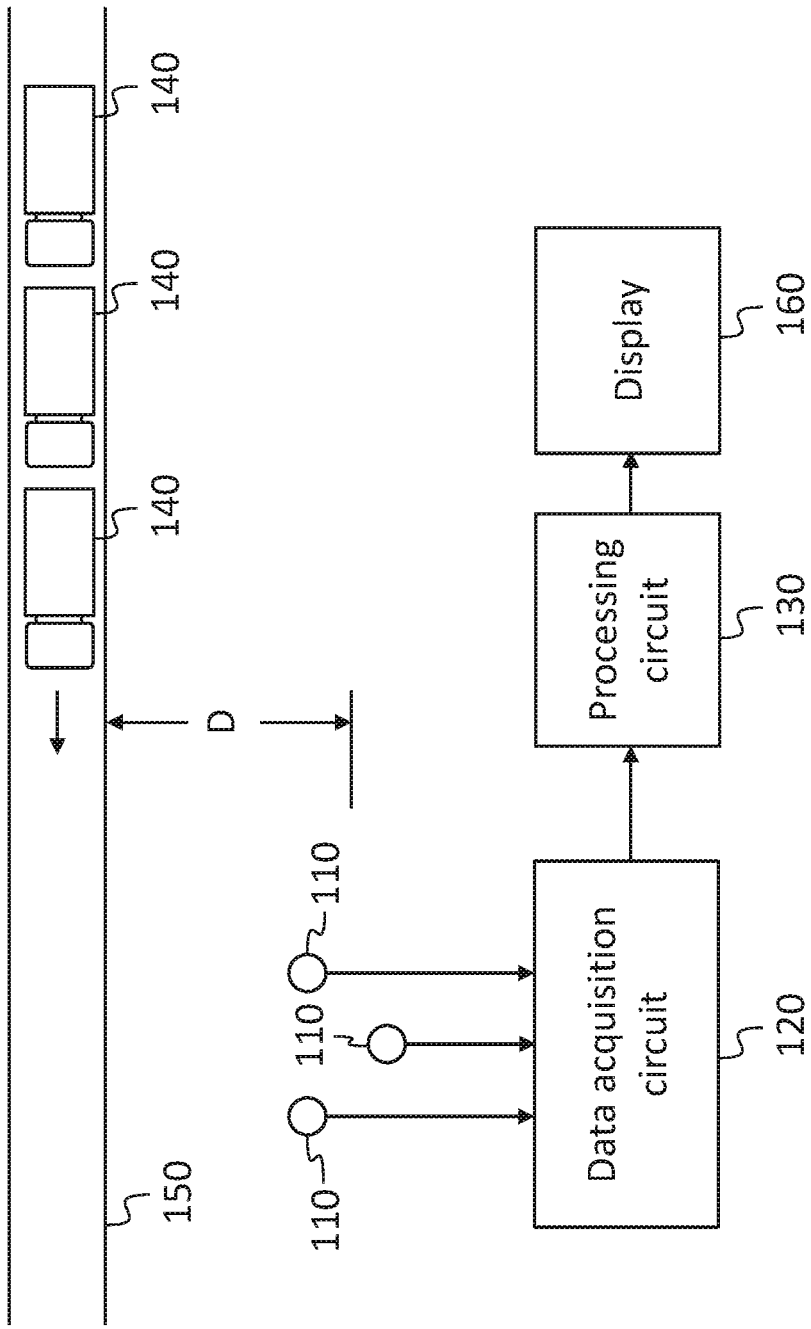
FIG. 1 is a schematic diagram of a system for isolating individual vehicle signatures, according to an embodiment of the present invention.

Referring to FIG. 1, in some embodiments, acoustic sensors may be used to identify and distinguish between targets, such as vehicles driving along a road. An array of three or more acoustic sensors 110 (e.g., an array of three microphones) may receive acoustic signals, and generate corresponding electrical signals (e.g., analog signals), which may be amplified and/or filtered and converted to digital form (e.g., by one or more analog to digital converters) in a data acquisition circuit 120. The digital output of the data acquisition circuit 120 may be sent to a processing circuit 130 for processing as described in further detail below. In some embodiments other kinds of sensors (e.g., (i) geophones operating as acoustic sensors, or (ii) geophones operating as seismic sensors, or (iii) geophones operating as hybrid acoustic and seismic sensors, or (iv) radar sensors) may be used instead of microphones.

The signals from the acoustic sensors may be subjected to a sequence of processing steps which extract information, from the acoustic signals, about vehicles (e.g., trucks 140) driving along a road near the acoustic sensors. The processing may determine, for example, how many vehicles drove along the road, their respective velocities (both magnitude and direction), and when they passed the acoustic sensors. In coarse detail, the processing proceeds as follows; further detail is provided below. Acoustic data is collected by the acoustic sensors during an observing time, sampled and digitized, to form a time record for each of the sensors. Each time record may be an array, each element of the array corresponding to the acoustic signal at a corresponding point in time. Each time record is converted to a spectrogram matrix, which is a measure of the power in the signal as a function of frequency and as a function of time.

The spectrogram matrices are combined to form a movement matrix, each element of which is a measure of the direction of arrival (i.e., the bearing), at each point in time within the observing time, of the acoustic signal in a respective frequency bin. The movement matrix (e.g., in FIGS. 3 and 5) may show darker regions, or regions in which the density of points is greater, along curves (FIG. 5) representing the paths travelled by the vehicles (e.g., starting with a bearing of −90 degrees when the vehicle is in the distance initially, passing through 0 degrees when the vehicle is nearest the acoustic sensors, and increasing to 90 degrees as the vehicle recedes into the distance in a direction opposite to the one from which it arrived.

A curve or "movement model" may be used to fit the dark regions (e.g., those of FIG. 3) with curves representing a vehicle moving, for example, with constant speed along the road. An example of such a fit is shown in FIG. 5. The fitting process may involve the use of a Hough transform, illustrated in FIG. 4A and described in further detail below.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

The acoustic signals detected by the array of acoustic sensors 110 may be generated, for example, by trucks 140 driving past the array of acoustic sensors 110 on a road 150. The processing circuit 130 may measure, using the acoustic signals it receives, the velocity and time of closest approach, or "time of the Closest Point of Approach" ($t_{CPA}$) of the trucks. Accordingly the output of the processing circuit 130 may include such information about the trucks. The output of the processing circuit 130 may be connected, for example, to a display 160 that may display the information (in text or graphical form) to an operator, or the output of the processing circuit 130 may be connected to a storage device for logging traffic information, or to another system such as a toll-collecting system or another surveillance system that may target one or more of the vehicles.

In some embodiments each microphone 110 may include an analog to digital converter, and the microphones may be connected directly to the processing circuit 130. In such an embodiment the separate data acquisition circuit 120 of FIG. 1 may be absent. Three microphones may be used to avoid an ambiguity in the direction of arrival of an acoustic signal that may be present if only two microphones are used. In some embodiments only two microphones may be used (e.g., if it is known that all vehicles in the area will be traveling on a single road near the array, as in FIG. 1) or more than three microphones may be used, e.g., to improve the signal to noise ratio of the system.

The system may be operated in a batch mode, as described in further detail below. For example, as described in further detail below, data may be collected during a 4-minute interval, or "observing time". As a result, when data collection is complete, the processing circuit 130 may store three time records (if three microphones are used), one for each of the microphones, each containing 4 minutes' worth of data (i.e., each time record being a matrix of 240,000 digital samples (i.e., a 1×240,000 matrix or a 240,000×1 matrix), if the sampling rate of the analog to digital converter is 1000 Hz).

The digital time records from the microphones may be processed in several stages as discussed in further detail below. The Code Listings below include MATLAB™ code for analyzing acoustic signals according to one embodiment. The Code Listings include 24 files, arranged in alphabetical order by file name. The main program of the Code Listings is PatentExample_main.m. The code from each file is included, in the Code Listings, as a set of numbered lines of code below the file name, which is shown in bold font in the Code Listings. In the following description of processing methods, the corresponding lines of code are included in square brackets, including the file name and the range of relevant line numbers, separated by a comma. For example, the name of the first file in the Code Listings is CalcSignature.m. Accordingly, lines 9-13 of this file may be identified using the notation "[CalcSignature.m, 9-13]".

Figure 2:
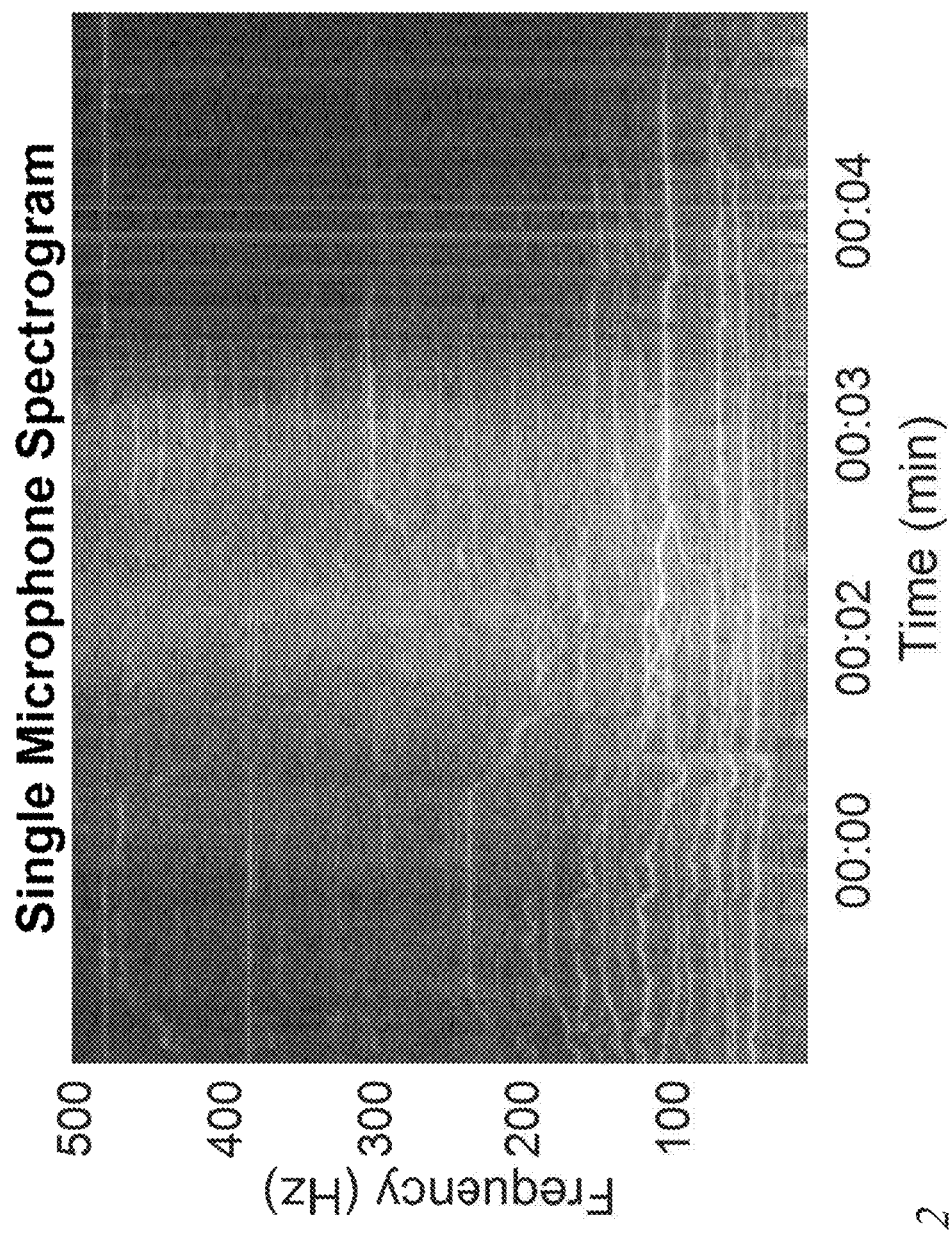
FIG. 2 is a spectrogram of an audio signal, according to an embodiment of the present invention.

Referring to FIG. 2, in one processing stage, a complex spectrogram matrix may be formed from each of the three time records ([waterfallpsd.m, 1-85], called from [PatentExample_main.m, 7-11]). FIG. 2 shows the magnitude of such a complex spectrogram matrix, with brighter regions in the image corresponding to higher power. Each such complex spectrogram matrix may be formed from a time record by taking a plurality of Fourier transforms (e.g., a fast Fourier transform (FFT)) of a respective portion (or "window") of the time record, and arranging the resulting Fourier transforms into a two-dimensional matrix, with one coordinate being frequency (corresponding to the vertical axis of FIG. 2), and the other coordinate being time. For example, non-overlapping rectangular windows each having a width of 1 second may be used, resulting in 240 windows of 1000 points each (if the sampling rate is 1000 Hz), and, accordingly, 240 FFTs, each having, e.g., 500 frequency points. In such an example, the complex spectrogram matrix corresponding to one of the time records may be a 240×500 matrix of complex numbers. In some embodiments a non-rectangular window shape (e.g., a Hanning window) may be used, and/or the windows may overlap, and/or zero padding is used to achieve a number frequency points that is a power of 2.

For each element of the complex spectrogram matrices, a bearing may be calculated using the relative phases of the complex values. For example, the three matrix elements, from the three complex spectrogram matrices, having a particular time coordinate (e.g., the time coordinate identifying the complex spectrogram matrix elements centered at a time of 15.5 seconds) and having a particular frequency coordinate (e.g., the frequency coordinate identifying the complex spectrogram matrix elements centered at a frequency of 200 Hz), may be processed to determine a bearing corresponding to that time coordinate and that frequency coordinate. In one embodiment, a frequency wavenumber analysis is used ([FKanalysis_discreteFrequencies2.m, 3-89], called from [PatentExample.m, 161], called from [PatentExample_main.m, 31]). In other embodiments, another algorithm (e.g., an interferometric algorithm) is used to generate a matrix of bearings ([FKanalysis_discreteFrequencies4.m, 3-32], called from [PatentExample.m, 164], called from [PatentExample_main.m, 31]). The calculated bearing may represent the direction of arrival of the dominant acoustic wave, at the frequency corresponding to the frequency coordinate and the time corresponding to the time coordinate.

Figure 3:
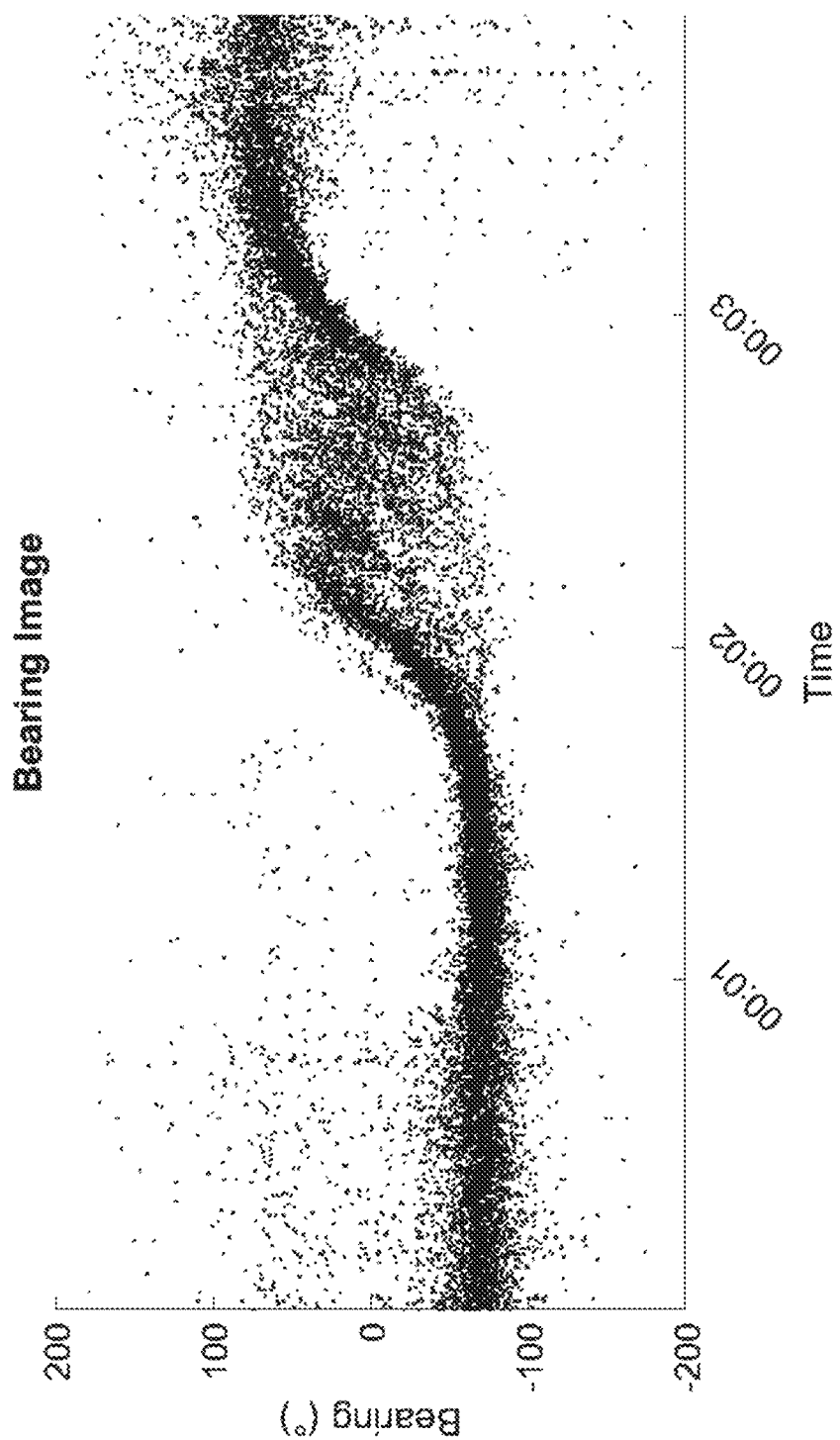
FIG. 3 is graph of a movement matrix, according to an embodiment of the present invention.

The result of calculating a bearing for each pair of frequency and time coordinates is a matrix of real numbers, referred to herein as a movement matrix (or "bearing image"), the movement matrix having a size less than or equal to that of any one of the complex spectrogram matrices (in one embodiment only the highest amplitudes of the spectrogram matrix are used to generate the movement matrix). The movement matrix may be represented graphically as shown, for example, in FIG. 3. In the graph of FIG. 3, each point corresponds to one element of the movement matrix. Each such element is plotted as a point at a horizontal coordinate corresponding to the time coordinate of the element, and at a vertical coordinate corresponding to the value of the element (i.e., to the bearing). The frequency coordinate of each element is not represented in the graph of FIG. 3. Five trajectories, corresponding to five trucks in a convoy driving on the road 150, past the matrix of acoustic sensors 110, are readily apparent. Each such trajectory has a bearing that starts at about −90 degrees, and changes slowly until the respective truck is near the array of acoustic sensors 110 (at a time between 2 and 3 minutes after the beginning of the data record), at which point the bearing changes relatively rapidly to +90 degrees, as the truck drives past the array of acoustic sensors 110.

The data illustrated in FIG. 3 are the result of processing audio time records obtained while a convoy of six trucks drove past the array of acoustic sensors 110. The trajectory corresponding to the sixth truck is faint in FIG. 3, but it is also visible, just to the left of the first of the five readily apparent trajectories.

The velocity of each of the vehicles may be inferred from the movement matrix using a fitting method referred to herein as a Hough transform, which generates, from the movement matrix, a Hough transform matrix for a movement model. For example, for a vehicle moving at a constant speed on a straight road, the movement model may be a model of the bearing as a function of time, expressed by the following equation:

$$\alpha(v, t_{CPA}; t) = \tan^{-1}(v(t - t_{CPA})/D) \qquad (1)$$

where $\alpha$ is the bearing, v is the velocity of the vehicle, $t_{CPA}$ is (as mentioned above) the time of closest approach, t is the time, and D is the perpendicular distance from the road 150 to the array of acoustic sensors 110. A different movement model may be used, for example, if the road is curved.

The Hough transform matrix may be generated by forming a two-dimensional matrix (the Hough transform matrix ([HoughTransformAtan3.m, 16])) having a first coordinate corresponding to one parameter of the movement model (e.g., to the velocity) and a second coordinate corresponding to the other parameter of the movement model (e.g., to the time of closest approach), and then assigning to each element of the Hough transform matrix a sum (e.g., a straight sum, or a weighted sum) of all of the points of the movement matrix that have a bearing value falling within a tolerance (referred to herein as a first "fitting tolerance"), of the movement model for the parameter values corresponding to the Hough transform matrix element being assigned ([HoughTransformAtan3.m, 35-74]). The code of the Code Listings assigns a value to each element of the Hough transform matrix by iterating (in an outer loop at [HoughTransformAtan3.m, 35-74], and in an inner loop at [HoughTransformAtan3.m, 39-73]) over all of the elements of the Hough transform matrix, and calculating (by counting, at [HoughTransformAtan3.m, 58-64]) the sum of all of the elements of the movement matrix falling within the first fitting tolerance of the movement model (i.e., all of the elements of the movement matrix having a bearing (or "data bearing value") value that differs from the bearing (or "model bearing value") by less than the first fitting tolerance). In some embodiments, the sum (as shown by code commented out at [HoughTransformAtan3.m, 61]), may be a weighted sum, weighted, e.g., by the magnitude returned by the frequency wavenumber analysis, or by a function of the bearing value (so that elements with bearing values near zero are weighted more heavily).

Figure 4A:
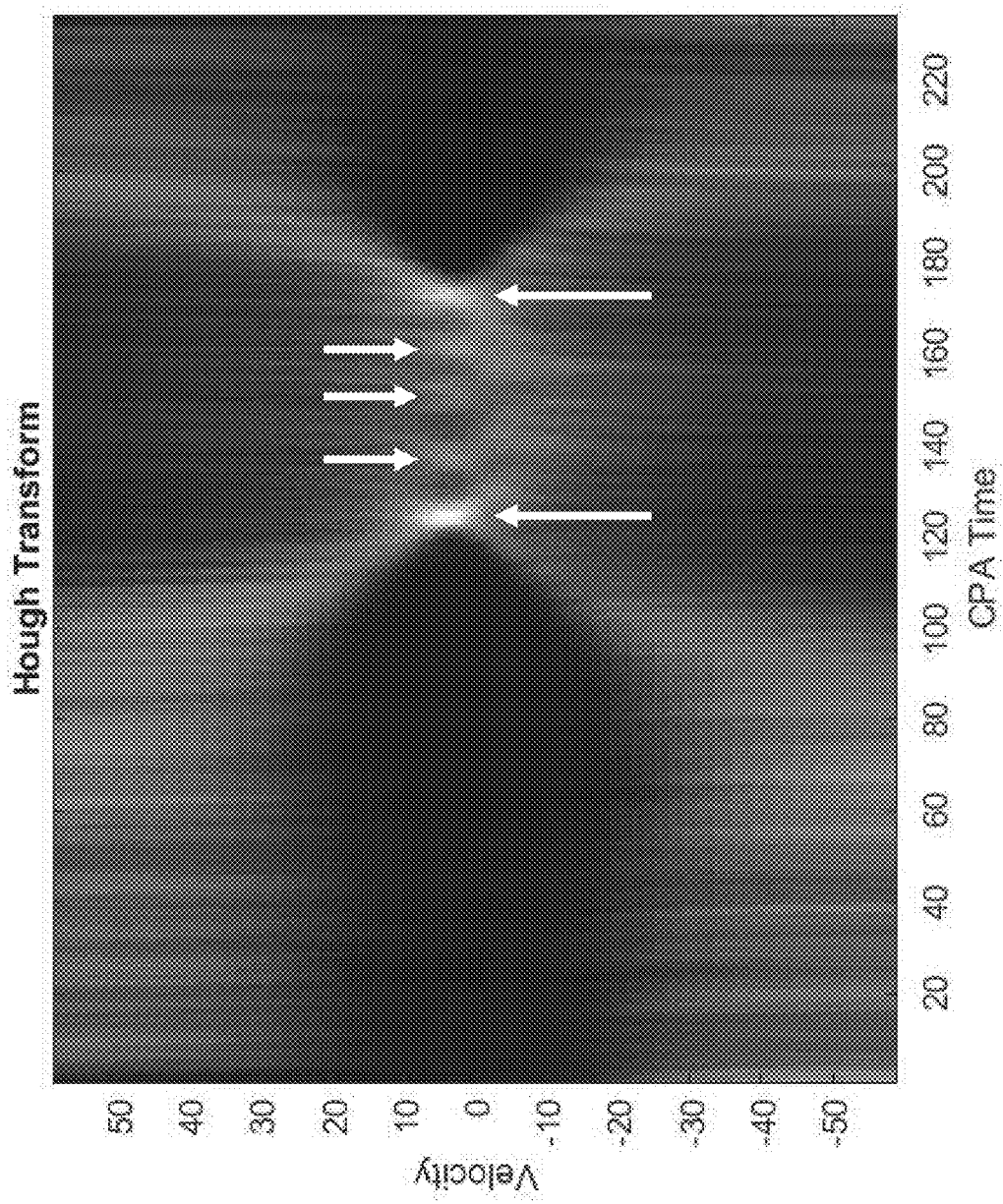
FIG. 4A is an image of a Hough transform matrix, according to an embodiment of the present invention.
Figure 4B:
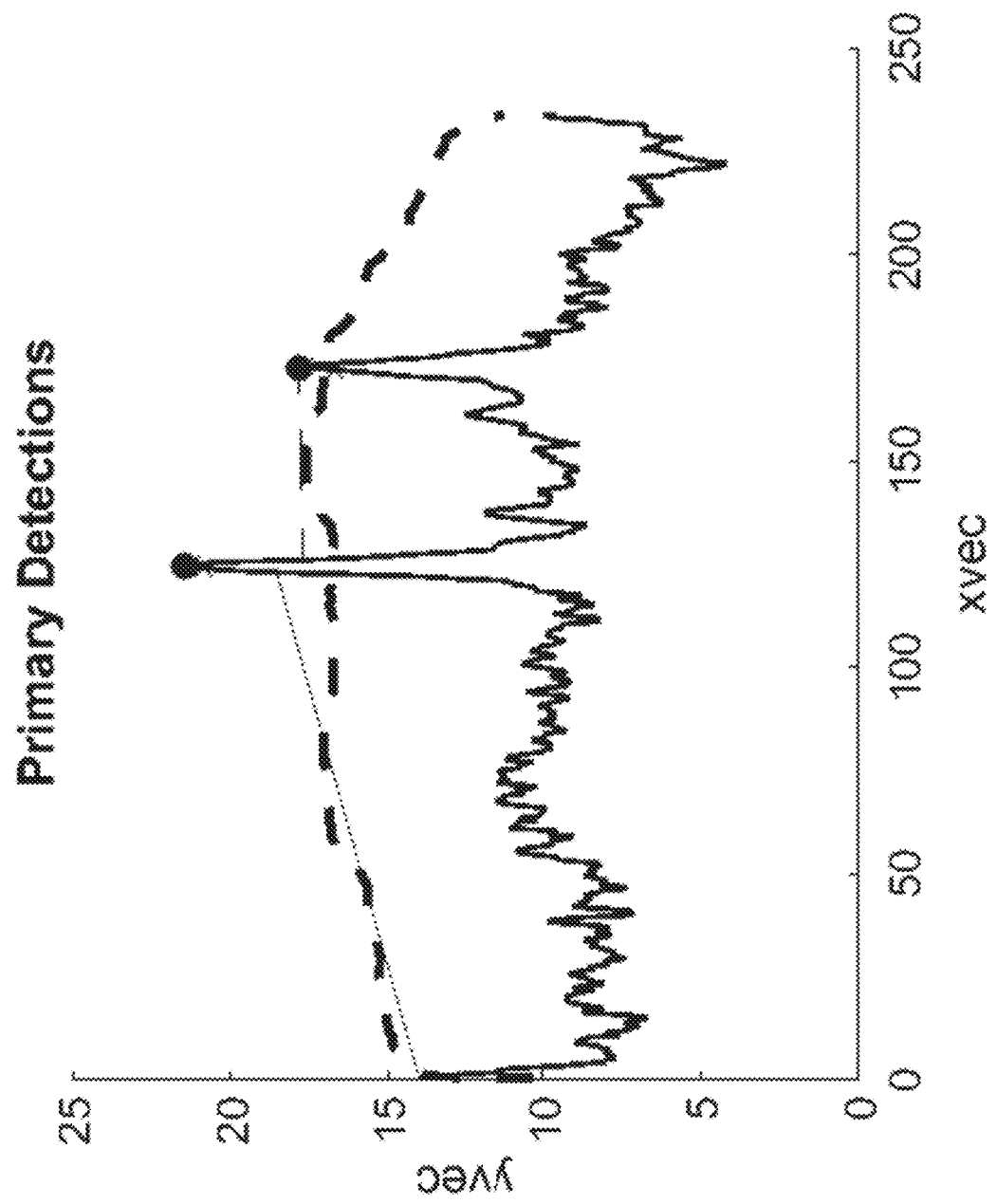
FIG. 4B is an image of a projection of the Hough transform matrix of FIG. 4A, according to an embodiment of the present invention.
Figure 4C:
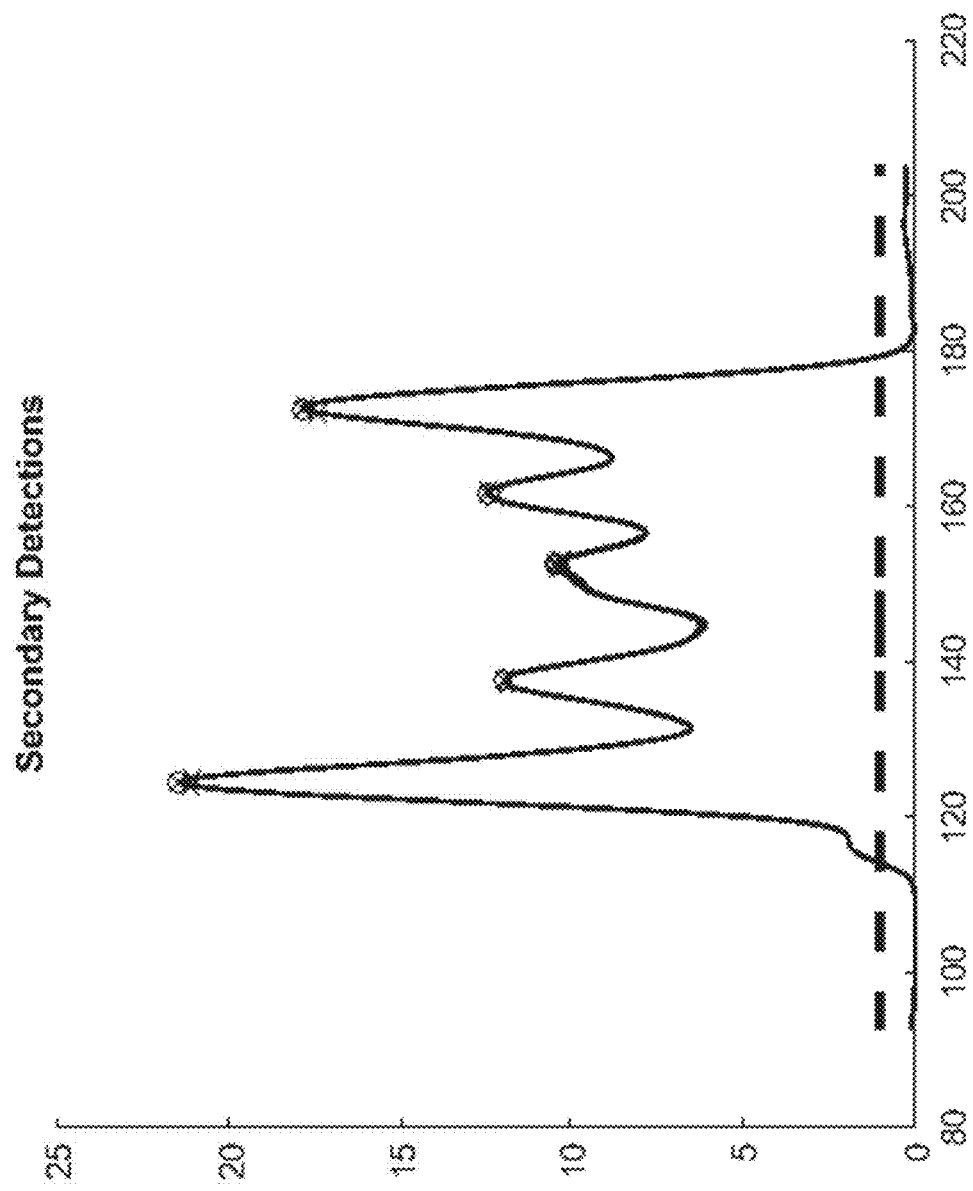
FIG. 4C is a graph of matrix elements along a line in the Hough transform matrix of FIG. 4A, according to an embodiment of the present invention.
Figure 5:
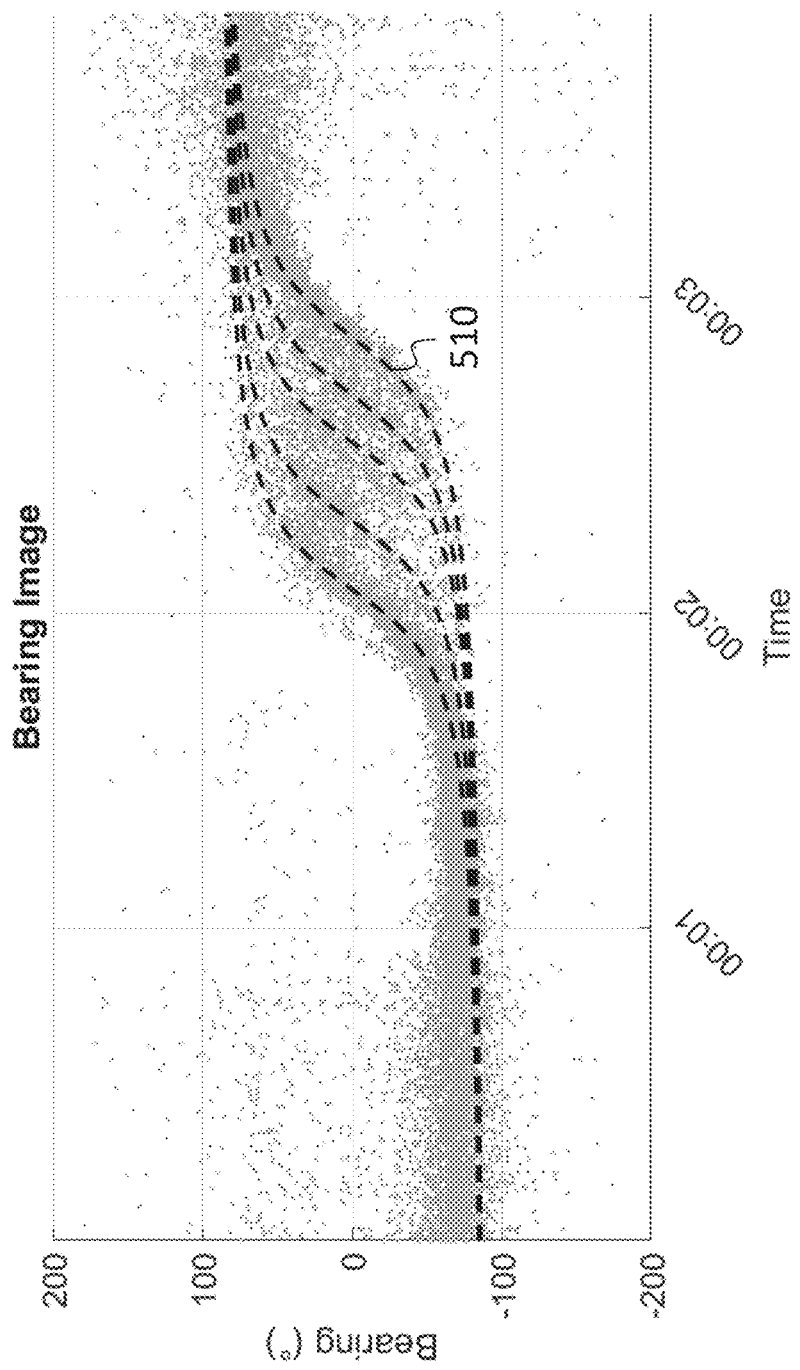
FIG. 5 is a graph of vehicle trajectories superimposed on a movement matrix, according to an embodiment of the present invention.

The Hough transform matrix that may result from the movement matrix of FIG. 3, for the movement model of Equation (1), is illustrated as an image in FIG. 4. Vertical arrows show five bright regions corresponding to five trucks detected by this method. To infer the velocity and time of closest approach of each truck, the following method may be used. The brightest outermost peaks (identified by the two longer, upward-pointing arrows) may be identified by projecting the image of FIG. 4A onto the horizontal axis (i.e., summing the Hough transform matrix along the velocity coordinate) to form a matrix such as that graphed in FIG. 4B, and identifying the two prominent peaks using a suitable peak-finding algorithm. In another embodiment, one of the two brightest peaks may be found by searching the Hough transform matrix for the brightest pixel (i.e., the element having the largest value), or the brightest super-pixel, where the brightness of a superpixel may be defined as the sum over a region (e.g., a 3×3 region, a 4×4 region, or a 5×5 region) of the image or of the Hough transform matrix. The second-brightest peak may then be found by similarly searching a portion of the Hough transform matrix, the portion being the portion of the Hough transform matrix excluding a neighborhood (e.g., a 10×10 square neighborhood) of the first peak. Once the locations of the two brightest peaks have been identified, the values of the Hough transform matrix along a line connecting these two peaks (graphed in FIG. 4C) may be used to find the intermediate peaks, e.g., by iteratively finding the largest value not near any already-identified peak. Each peak found in the Hough transform matrix in this manner identifies by its coordinates the velocity and time of closest approach of a vehicle.

Embodiments of the present invention may be resistant to false alarms. False alarms or false positive detections may limit the performance of related art sensor systems. False alarms unnecessarily expend sensor energy, reducing the system lifetime. High frequencies of false alarms can overwhelm a human or algorithmic classifier, but even a few false alarms can lower an operator's confidence in a sensor system sometimes to the point where the sensor is no longer trusted.

Matching detections against the motion model enables a false alarm resistant system. Common environmental factors which cause false alarms (e.g. wind for an acoustic system) will not move across an array in a predictable or regular pattern. For this reason specific motion models which describe predictable, and regular patterns naturally exclude false alarms.

Figure 6:
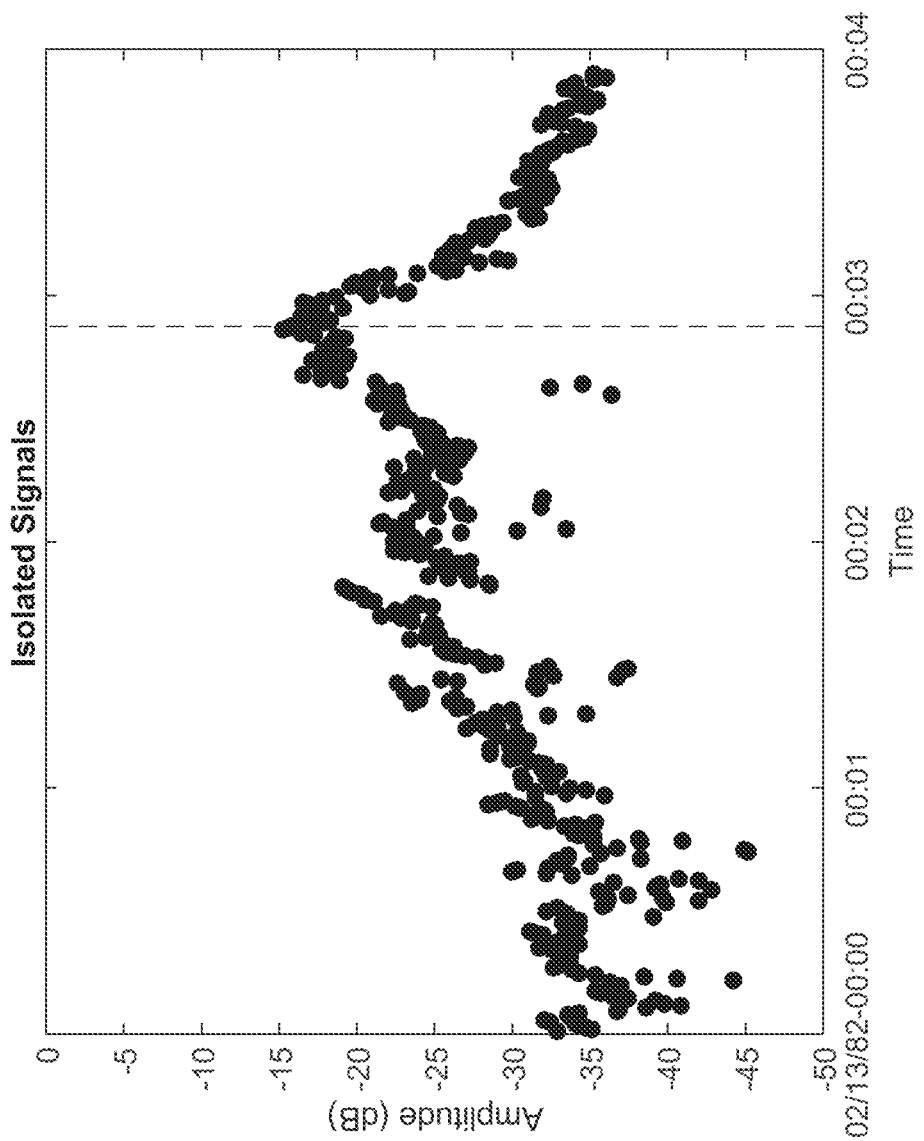
FIG. 6 is a graph of magnitude as a function of time, according to an embodiment of the present invention.

Once the velocity and time of closest approach of a vehicle has been measured as described above, this information may be used to then attribute, to that vehicle, elements of the initially captured composite acoustic signals. For example, in FIG. 5, the bearing trajectory 510 followed, as a function of time, by the last truck is superimposed on the graph of the movement matrix. Individual elements of the movement matrix may then be associated with this trajectory 510 if they fall within a second fitting tolerance of the trajectory 510 ([HoughTransformAtan3.m, 138-149]). Once these elements are identified, the corresponding elements of other matrices (e.g., of the complex spectrogram matrices, or of a magnitude matrix that may be returned by the frequency wavenumber analysis) are readily identified, or "isolated" (being elements with the same coordinates in their respective matrices). For example, FIG. 6 shows the elements, of the magnitude (or "amplitude") returned by the frequency wavenumber analysis, associated with the trajectory 510 of the last truck. As may be expected, the magnitude has a peak at the time of closest approach, approximately 2 minutes and 50 seconds after the start of data collection.

Figure 7:
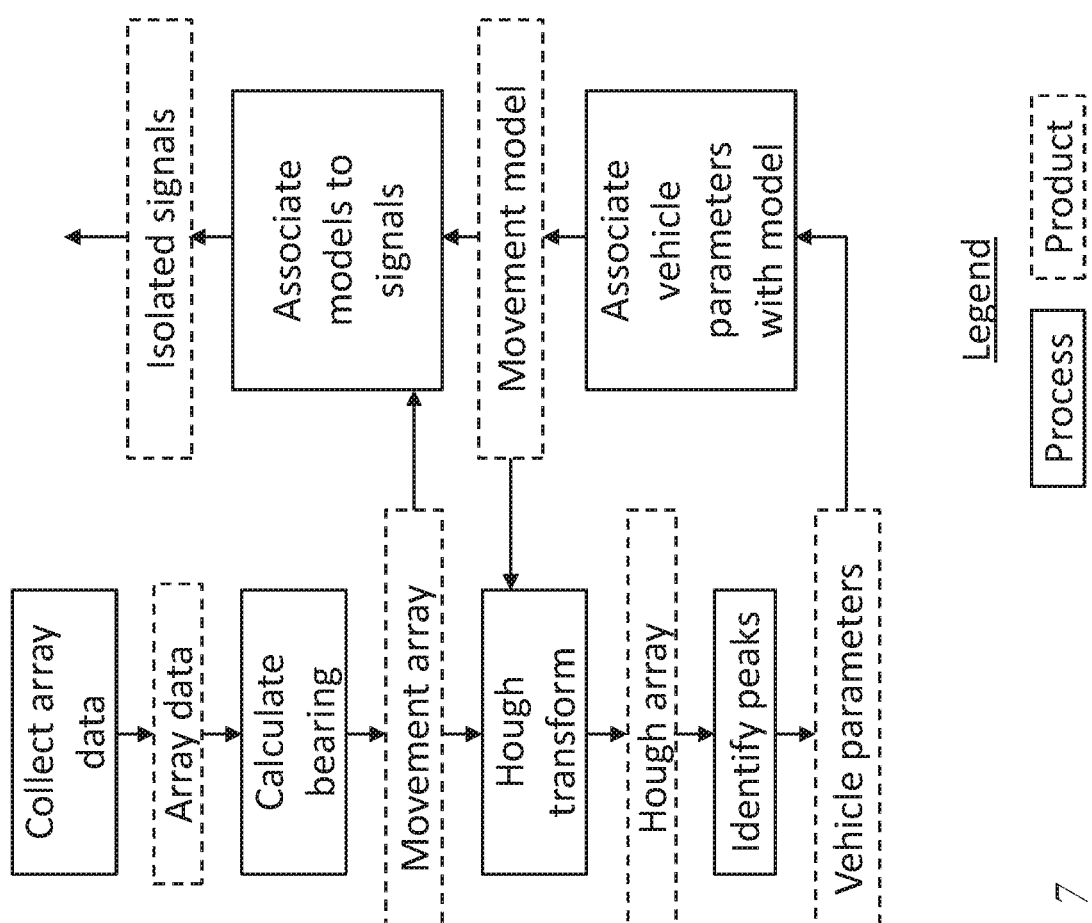
FIG. 7 is a process-product flow diagram, according to an embodiment of the present invention.

FIG. 7 shows a process-product flow diagram according to one embodiment. As discussed above, and illustrated in FIG. 7, acoustic data are collected and a plurality of bearing values are calculated to form a movement matrix. The movement matrix is transformed to a Hough transform matrix, peaks within which (i) correspond to vehicles and (ii) have coordinates corresponding to vehicle parameters such as velocity and time of closest approach. A movement model may then be created for any of the vehicles, and signals may be associated with the movement model; these associated signals are isolated signals for the vehicle.

As used herein, the term "structure" means a collection of finite precision numbers (e.g., real or complex floating point numbers, fixed point numbers, or integers) stored in, or suitable for storage in, a computer, including without limitation a vector, a matrix, and an array, however represented and stored (e.g., whether in a set of contiguous sequential memory locations, a linked list, or otherwise). A "structure element" refers to one of the numbers of the collection of numbers that forms the structure. Various collections of numbers herein are referred to with the terms "matrix" and "matrices"; it will be understood that the same collections of numbers arranged differently (e.g., as linked lists) may instead be used to practice embodiments of the invention. Although some embodiments described herein identify vehicles moving in two dimensions (e.g., on a road on flat ground), it will be understood that some embodiments may be employed to distinguish signals in three dimensions, e.g., from a plurality of aircraft flying a common flight path.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a system and method for signal isolation of individual vehicle signatures have been specifically described and illustrated herein, many modifications and variations will be apparent to those skilled in the art. Accordingly, it is to be understood that a system and method for signal isolation of individual vehicle signatures employed according to principles of this invention may be embodied other than as specifically described herein. The invention is also defined in the following claims, and equivalents thereof.

What is claimed is:

1. A system for detecting objects moving along a path, the system comprising:
a plurality of sensors; and
a processing circuit connected to the sensors,
the processing circuit being configured to:
receive a plurality of digital time records of acoustic data, each representing a signal sensed by a respective one of the plurality of sensors,
form a plurality of complex spectrogram structures, each of the complex spectrogram structures being formed from a respective one of the digital time records, each element of the complex spectrogram structure having a frequency coordinate and a time coordinate,
form a movement structure from the complex spectrogram structures, each element of the movement structure:
having a frequency coordinate,
corresponding to a respective element of the complex spectrogram structure, and
having a value corresponding to an angle of arrival of an acoustic wave at the frequency corresponding to the frequency coordinate of the element of the movement structure,
fit a movement model to the movement structure, the movement model representing an object moving with constant velocity along the path; and
infer a velocity of a first object from the fit.

2. The system of claim 1, wherein the processing circuit is further configured to infer a time of closest approach of the first object from the fit.

3. The system of claim 1, wherein the path is a substantially straight path, and the movement model is a function returning a bearing as a function of two parameters and a time variable t, the parameters being a velocity v of the object and a time of closest approach $t_{CPA}$, the function being: $\tan^{-1}(v(t-t_{CPA})/D)$, wherein D is a perpendicular distance from the path to the plurality of sensors.

4. The system of claim 1, wherein the forming of the movement structure comprises calculating a bearing, for each element of each of the complex spectrogram structures, using a frequency wavenumber analysis.

5. The system of claim 1, wherein the fitting of a movement model to the movement structure comprises:
forming a Hough transform structure from the movement structure, for the movement model; and finding coordinates of a first peak in the Hough transform structure, and wherein the inferring of the velocity of the first object from the fit comprises inferring the velocity of the first object from the coordinates of the first peak.

6. The system of claim 5, wherein each element of the movement structure has a time coordinate, a frequency coordinate, and a data bearing value, and wherein the forming of the Hough transform comprises counting, for a structure element of the Hough transform structure corresponding to a velocity and a time of closest approach, the number of elements of the movement structure for which:

the movement model, when evaluated at the time coordinate, the velocity, and the time of closest approach, returns a model bearing value within a first fitting tolerance of the data bearing value.

7. The system of claim 5, wherein the finding of the first peak comprises finding a structure element having the greatest value within the Hough transform structure.

8. The system of claim 7, wherein the processing circuit is further configured to:

find coordinates of a second peak in the Hough transform structure, and infer, from the coordinates of the second peak:
a velocity of a second object, and
a time of closest approach of the second object,
the finding of the second peak comprising finding a structure element having the greatest value within a portion of the Hough transform structure excluding a neighborhood of the first peak.

9. The system of claim 8, wherein the processing circuit is further configured to:

find coordinates of a third peak in the Hough transform structure, and infer a velocity of a third object from the coordinates of the third peak, the finding of the third peak comprising finding a maximum value within a portion of the Hough transform structure that is on a straight line joining the first peak and the second peak, and that excludes a neighborhood of the first peak and a neighborhood of the second peak.

10. The system of claim 5, wherein the processing circuit is further configured:

from the coordinates of a peak in the Hough transform structure, to generate a movement model corresponding to the coordinates of the peak; and from the movement model, to identify a plurality of structure elements of the movement structure associated with the movement model.

11. The system of claim 10, wherein the identifying of the plurality of structure elements of the movement structure comprises identifying elements differing in bearing from the movement model by less than a second fitting threshold.

12. A method for detecting objects moving along a path, the method comprising:

receiving a plurality of digital time records of data, each representing a signal sensed by a respective one of a plurality of sensors, forming a plurality of complex spectrogram structures, each of the complex spectrogram structures being formed from a respective one of the digital time records, each element of the complex spectrogram structure having a frequency coordinate and a time coordinate, forming a movement structure from the complex spectrogram structure, each element of the movement structure:

having a frequency coordinate,
corresponding to a respective element of the complex spectrogram structure, and
having a value corresponding to an angle of arrival of a signal at the frequency corresponding to the frequency coordinate of the element of the movement structure, fitting a movement model to the movement structure, the movement model representing an object moving with constant velocity along the path; and inferring a velocity of a first object from the fit.

13. The method of claim 12, further comprising inferring a time of closest approach of the first object from the fit.

14. The method of claim 12, wherein the path is a substantially straight path, and the movement model is a function returning a bearing as a function of two parameters and a time variable t, the parameters being a velocity v of the object and a time of closest approach $t_{CPA}$, the function being: $\tan^{-1}(v(t-t_{CPA})/D)$, wherein D is a perpendicular distance from the path to the plurality of sensors.

15. The method of claim 12, wherein the forming of the movement structure comprises calculating a bearing, for each element of each of the complex spectrogram structures, using a frequency wavenumber analysis.

16. The method of claim 12, wherein the fitting of a movement model to the movement structure comprises:

forming a Hough transform structure from the movement structure, for the movement model; and finding coordinates of a first peak in the Hough transform structure, and wherein the inferring of the velocity of the first object from the fit comprises inferring the velocity of the first object from the coordinates of the first peak.

17. The method of claim 16, wherein each element of the movement structure has a time coordinate, a frequency coordinate, and a data bearing value, and wherein the forming of the Hough transform comprises counting, for a structure element of the Hough transform structure corresponding to a velocity and a time of closest approach, the number of elements of the movement structure for which:

the movement model, when evaluated at the time coordinate, the velocity, and the time of closest approach, returns a model bearing value within a first fitting tolerance of the data bearing value.

18. The method of claim 16, wherein the finding of the first peak comprises finding a structure element having the greatest value within the Hough transform structure.

19. The method of claim 18, further comprising:

finding coordinates of a second peak in the Hough transform structure, and inferring, from the coordinates of the second peak:
a velocity of a second object, and
a time of closest approach of the second object,
the finding of the second peak comprising finding a structure element having the greatest value within a portion of the Hough transform structure excluding a neighborhood of the first peak.

20. The method of claim 19, further comprising:

finding coordinates of a third peak in the Hough transform structure, and inferring a velocity of a third object from the coordinates of the third peak, the finding of the third peak comprising finding a maximum value within a portion of the Hough transform structure that is on a straight line joining the first peak and the second peak, and that excludes a neighborhood of the first peak and a neighborhood of the second peak.

* * * * *